United States Patent [19]
Li

[11] Patent Number: 5,450,915
[45] Date of Patent: Sep. 19, 1995

[54] ELECTRIC MOTOR-IN-WHEEL

[76] Inventor: I-Ho Li, 5F, 21, Lane 16, Sec. 2, Chung-shan N. Rd., Taipei, Taiwan

[21] Appl. No.: 169,182

[22] Filed: Dec. 20, 1993

[51] Int. Cl.$^6$ ............................................. B62M 7/12
[52] U.S. Cl. ................... 180/65.5; 180/220; 74/594.1; 310/67 R
[58] Field of Search ............ 180/65.5, 65.6, 220, 180/65.1, 214; 74/594.1; 310/67 R

[56] References Cited

U.S. PATENT DOCUMENTS

| | | | |
|---|---|---|---|
| 2,348,053 | 5/1944 | Bowker | 180/65.5 X |
| 3,566,165 | 2/1971 | Lohr | 310/67 R |
| 3,897,843 | 8/1975 | Hapeman et al. | 180/65.5 |
| 4,346,777 | 8/1982 | Restelli | 180/65.5 X |
| 4,389,586 | 6/1983 | Foster et al. | 310/67 R |
| 4,924,125 | 5/1990 | Clark | 310/67 R |
| 5,014,800 | 5/1991 | Kawamoto et al. | 180/65.5 |
| 5,127,485 | 7/1992 | Wakuta et al. | 180/65.5 |
| 5,183,133 | 2/1993 | Roy et al. | 180/65.5 X |
| 5,246,082 | 9/1993 | Alber | 180/65.5 |
| 5,272,938 | 12/1993 | Hsu et al. | 74/594.1 |
| 5,281,886 | 1/1994 | Ohta | 310/67 R X |
| 5,327,034 | 7/1994 | Conture et al. | 310/67 R |
| 5,341,892 | 8/1994 | Hirose et al. | 180/65.5 X |
| 5,350,185 | 9/1994 | Robinson | 280/276 |

FOREIGN PATENT DOCUMENTS

| | | | |
|---|---|---|---|
| 0396073 | 11/1990 | European Pat. Off. | 180/65.5 |
| 3632781 | 3/1988 | Germany | 180/65.5 |

*Primary Examiner*—Mitchell J. Hill
*Assistant Examiner*—F. Zeender
*Attorney, Agent, or Firm*—Jacobson, Price, Holman & Stern

[57] ABSTRACT

An electric motor-in-wheel includes an armature formed of a stack of silicon steel plates and a winding wound round the stack of silicon steel plates and received within the motor casing, a flat type commutator mounted within the armature in the center and connected thereto in a flush manner so that the width and the space of motor can be reduced and the torque of motor is sufficient without the need for a planetgear assembly. A programmable control circuit connected to the armature by electric wires which are inserted through a wire hole on the wheel axle, the programmable control circuit detects the rotation speed of the outer shell of the motor so as to automatically control the motor to work or cut off power supply from the motor according to a predetermined speed range.

8 Claims, 5 Drawing Sheets

ELECTRIC MOTOR-IN-WHEEL

BACKGROUND OF THE INVENTION

The present invention relates to an electric motor-in-wheel which comprises an armature formed of a stack of silicon steel plates and a winding wound round the silicon steel plates, a flat type commutator mounted within the center of the armature in a flush manner to minimize installation space, a wheel axle having a longitudinal hole and a side hole for inserting the electric wires, a control switch to regulate the voltage and current to the motor. The present invention has small volume, enough torque and good effectiveness of safety and practicality.

Regular motorized bicycles commonly use a conventional cylindrical motor controlled by an On/Off switch to turn the wheels through a planetgear assembly. A cylindrical motor for this purpose is heavy and needs much installation space. Further, using an On/Off motor to control the motor of a motorized bicycle may cause accidents easily as the motor runs at full speed suddenly when it is turned on. U.S. Pat. No. 3,897,843 discloses an electric motorized wheel in which the commutator on the armature is disposed in parallel with the revolving shaft, and therefore the motor needs much installation space. As the torque of the motor is weak, a planetgear assembly must be installed to increase the torque. Because of the installation of the planetgear assembly, the size and weight of the electric motorized wheel cannot be reduced. Further, the power supply electric wires are inserted through the fixed motor casing so that a larger center bearing must be used in order to match with the arrangement of the electric wiring. Further, there is also disclosed an electric motor device under U.S. patent appln. Ser. No. 07/986,064, which uses an armature formed of mylar or mica, and the field magnet is disposed on two opposite sides by the armature winding. Because the torque of the electric motor is not sufficient, a planetgear assembly must be installed.

SUMMARY OF THE INVENTION

The present invention has been accomplished under the aforesaid circumstances. Therefore the principal object of the present invention is to provide an electric motor-in-wheel which eliminates the aforesaid drawbacks. According to one aspect of the present invention, the armature is comprised of a stack of silicon steel plates and a winding wound round the silicon steel plates, and the commutator is made to have a flat shape and is mounted within the armature in the center in a flush manner. Therefore, the size of the motor is greatly reduced. According to another aspect of the present invention, the field magnet is made to have a annular shape and is mounted around the armature, and the torque of the motor is sufficient without the need for a planetgear assembly. The electric wires can be inserted and extended to the outside through the center of the wheel axle so that the bearing for supporting the outer shell can be made relatively smaller, then the volume and the weight of motor can be reduced.

According to still another aspect of the present invention, a solenoid inductor can be installed to detect the speed of the wheel so as to automatically cut off power supply from the motor as the speed of the wheel drops below a predetermined range, or to automatically turn on the motor as the speed of the wheel surpasses a predetermined range. Therefore, the danger of having the motor suddenly start can be prevented. The present invention has the good effectiveness of economy, simplicity, safety and practicality.

DETAILED DESCRIPTION OF THE PREFERRED EMBODIMENT

Figure 1:
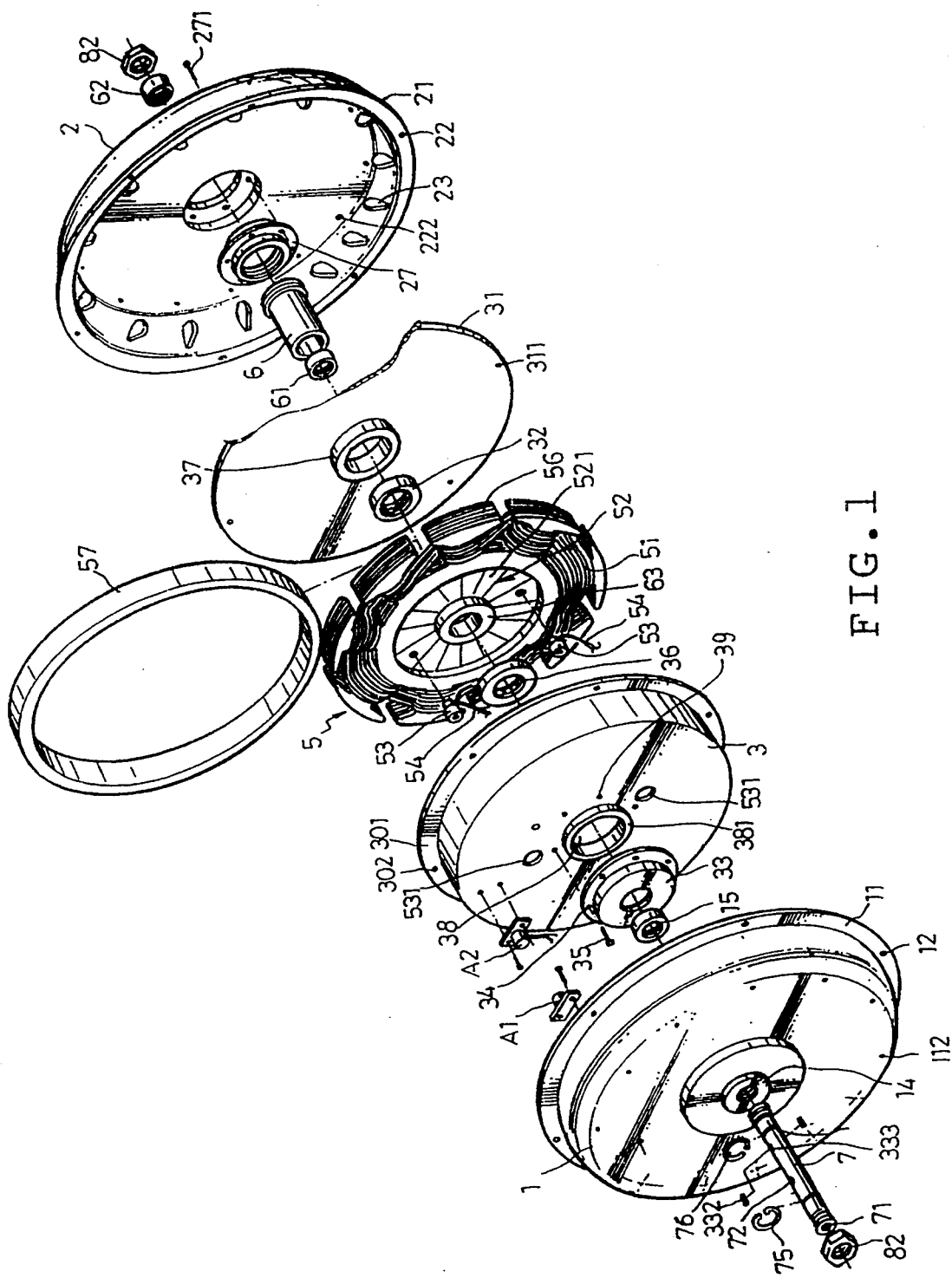
FIG. 1 is an exploded view of an electric motor-in-wheel according to the preferred embodiment of the present invention.

Referring to the annexed drawings in detail, an electric motor-in-wheel in accordance with the present invention is generally comprised of a first outer shell 1, a second outer shell 2, a motor casing 3, a cover board 31, an armature 5, a flat type commutator 52, a field magnet 57, a hub 6, a plurality of bearings 61;62;32;36;15, a mounting block 33, a battery box 9, and a control box 10.

Figure 3:
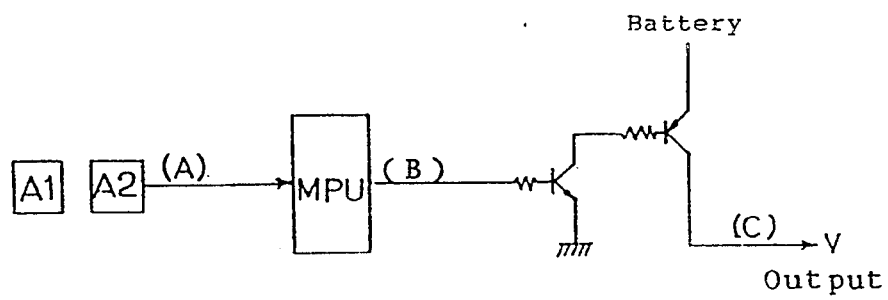
FIG. 3 is a diagram of control system according to the present invention.

The armature 5 is comprised of a stack of thin silicon steel plates 56, and a winding 51 wound round the silicon steel plates 56. The flat type commutator 52 is mounted within the armature 5 in the center in a flush manner. Two electrical brushes 53 are mounted within respective holes 531 on the motor casing 3, and respectively connected to the flat type commutator 52 by electric wires 54. The field magnet 57 is made of annular shape and mounted around the armature 5. The whole device is controlled by a programmed circuit board device (see FIG. 3) to effectively control and carry out the efficiency of the motor without the use of a planetgear assembly to reduce the speed or increase the torque. This arrangement greatly reduces the installation space of the motor and has the features of economy, simplicity and practicality.

The electric motor-in-wheel is mounted on a wheel axle 7, which is fixed between the bottom ends of the two fork blades 8 of the front fork of a bicycle by clamps 75,76 and locknuts 82. The wheel axle 7 comprises a tunnel or a longitudinal hole 71 extended from an outer end thereof through the longitudinal axis thereof at a certain distance, a side hole 72 linked to the longitudinal hole 71. The electric wires 54 which are connected to the electrical brushes 53 are inserted through the side hole 72 into the longitudinal hole 71 and then extended to the outside. Because of this special wiring arrangement, the bearings for supporting the outer shells 1,2 can be made relatively smaller. Shock absorbing spring means may be mounted between the wheel axle 7 and the fork blades 8 to absorb or lessen shocks in order to buffer the impact transmitted to the electric motor-in-wheel during the running of the bicycle. The similar shock absorbing spring means may be mounted on the rear wheel of the bicycle.

The armature 5 is mounted on a mounting block 63 fastened around the hub 6. The flat type commutator 52 is comprised of a plurality of separate commutator segments 521. The number of the commutator segments 521 is determined according to the number of poles of the armature 5. The flat type commutator 52 is mounted on the armature 5 and is perpendicularly mounted around the hub 6 so that the width and volume of the motor can be reduced. The two electrical brushes 53 are mounted on the motor casing 3 and disposed in parallel with the hub 6. The front end of each electrical brush 53 perpendicularly touches the commutator 52.

Figure 5:
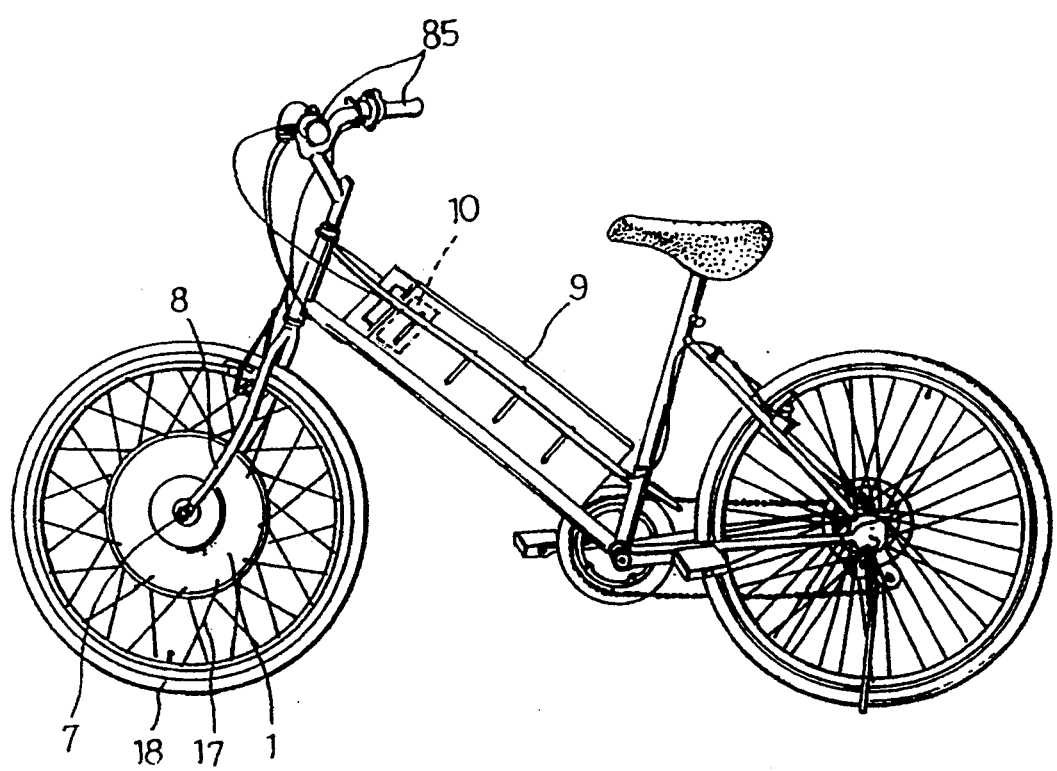
FIG. 5 is an applied view of the present invention.
Figure 6:
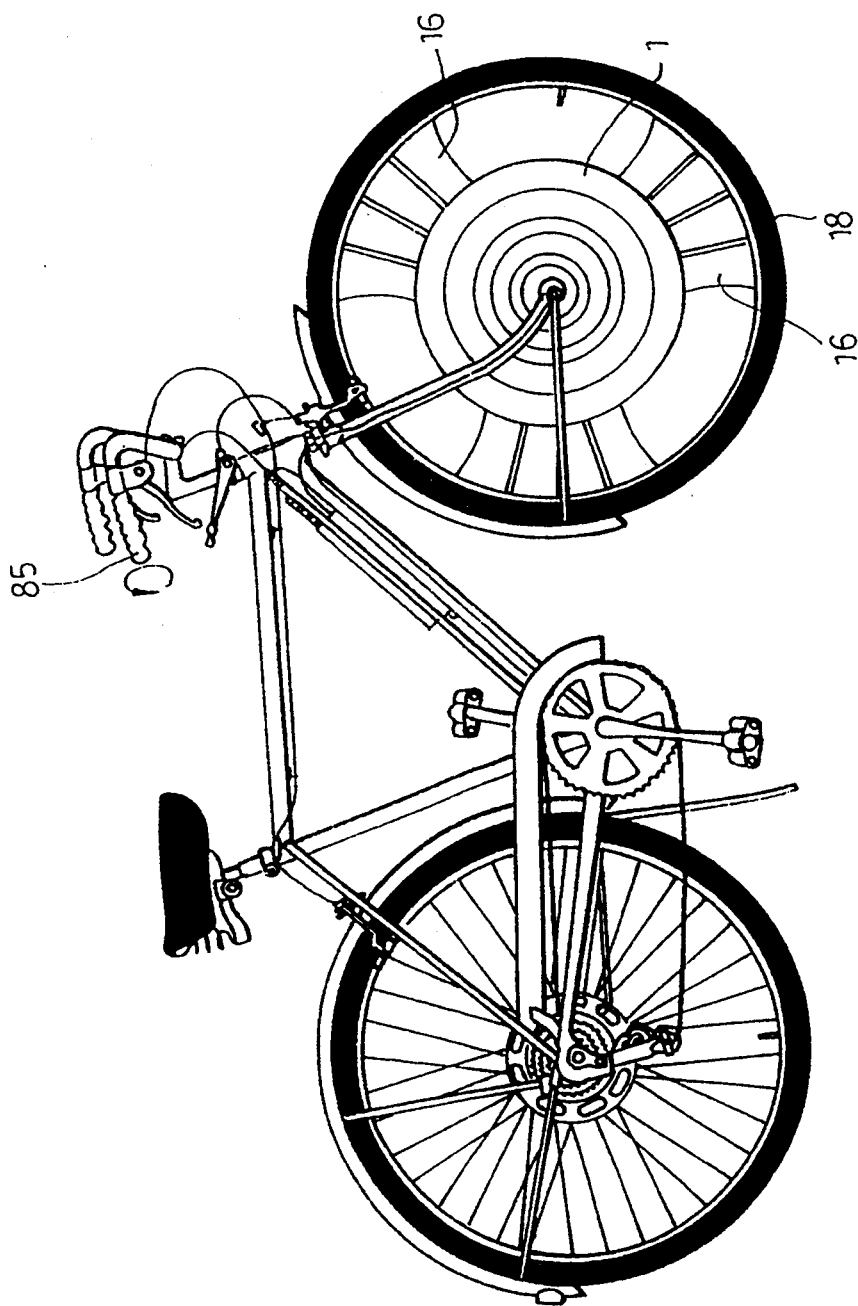
FIG. 6 is another applied view of the present invention.

Two bearings 61,62 are fixed within the hub 6 at two opposite ends, and moved to turn around the wheel axle 7. An one-way clutch 27 is fixed between the hub 6 and the second outer shell 2. A wheel 18 is mounted around the outer shells 1,2 by steel wires 17 (see FIG. 5) or aluminum plates 16 (see FIG. 6).

The one-way clutch 27 may be fastened to the second outer shell 2 by pins 271 or suitable fastening elements. The outer shells 1,2 have a respective outward flange 11 or 21 with respective mounting holes 12 or 22. Through the mounting holes 12,22 on the outward flanges 11,21, the outer shells 1,2 are fastened together by screws. The outer shells 1,2 are also connected to the steel wires 17 (or aluminum plates 16) of the wheel 18. The first outer shell 1 comprises a center projecting block 14 on an outer side affixed with a bearing 15 in the center. By means of the bearing 15, the first outer shell 1 can be smoothly and stably turned on the wheel axle 7. Therefore, the armature 5 of the motor-in-wheel, the mounting block 63, the hub 6, the bearings 15,61,62, the clutch 27, the first outer shell 1, the second outer shell 2, the steel wires 17 (or aluminum plates 16), and the wheel 18 are fastened together. Therefore, the torque from the armature 5 can be transmitted to the wheel 18, and the motor-in-wheel is revolvably supported on the wheel axle 7 by the bearings 15,61,62 to bear the load.

Figure 2:
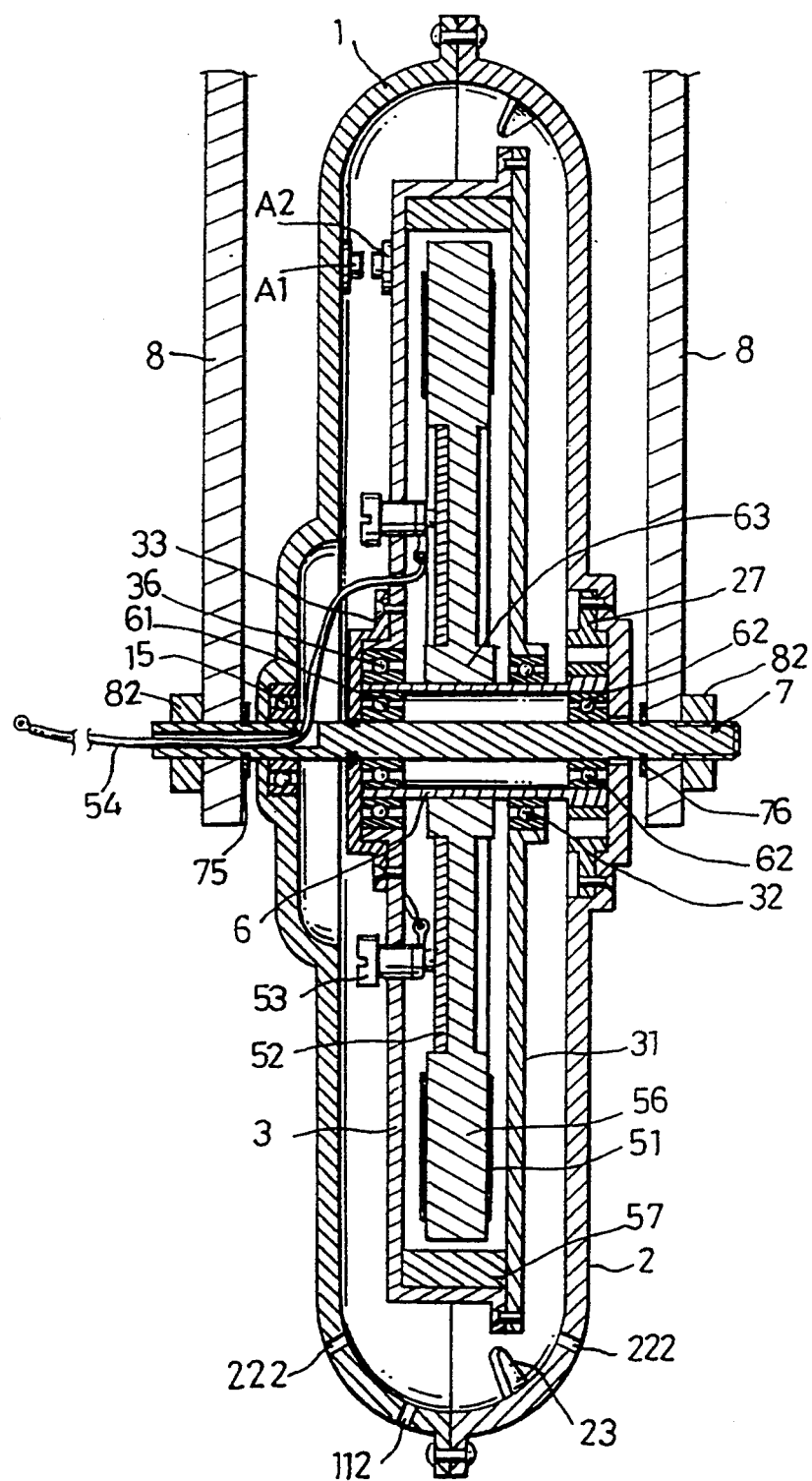
FIG. 2 is a sectional view of the electric motor-in-wheel shown in FIG. 1.

The motor casing 3 is mounted around the wheel axle 7 and fixed thereto, having mounting holes 302 spaced around an outward flange 301 thereof. The cover board 31 has a plurality of mounting holes 311 spaced around the border thereof and respectively connected to the mounting holes 302 on the motor casing 3 by screws or suitable fastening elements (not shown). When the motor casing 3 and the cover board 31 are fastened together, a storage chamber is defined within the motor casing 3 and the cover board 31, which receives the armature 5. The field magnet 57 is fixed to the motor casing 3 around the periphery thereof. The cover board 31 has a center round hole 37, within which a bearing 32 is mounted. The motor casing 3 has an annular flange 381 disposed around a circular center opening 38 thereof to hold a bearing 36 on the inside. A circular mounting block 33 is fastened to the motor casing 3 around the annular flange 381 by inserting pins 35 into respective mounting holes 34 on the circular mounting block 33 and respective mounting holes 39 on the motor casing 3. The circular mounting block 33 is also affixed to the wheel axle 7 by a key 332. The wheel axle 7 has a key hole 333, which receives the key 332. When assembled, the bearings 32,36 are mounted around the hub 6 (See FIG. 2) for permitting the hub 6 to be freely turned.

The second outer shell 2 comprises a plurality fins 23 spaced around the border thereof on the inside, which induces a current of air to carry heat and dust out of the motor-in-wheel during the rotary motion of the second outer shell 2 (namely, during the operation of the motor-in-wheel). The outer shells 1,2 further comprise through holes 112 for ventilation and drainage of water, and tie holes 222 are for mounting the steel wires 17.

The motor-in-wheel produces a sufficient torque to turn the wheel 18 without the installation of any planet-gear assembly. However, a conventional planetgear assembly may be installed to increase the torque, if required.

The battery box 9 is mounted on the frame of the bicycle at a suitable location. The control box 10 may be fastened in the battery box 9 or disposed on the frame of the bicycle at any suitable location. The control box 10 comprises a main processing unit (MPU) which controls the operation of the motor-in-wheel. A solenoid inductor A which comprises a reflector A1 and a receiver A2 is installed in the bicycle to detect the speed of rotation of the wheel. A reflector A1 can be mounted on the first outer shell 1 on the inside. A receiver A2 is mounted on the motor casing 3 corresponding to the reflector A1. The reflector A1 and the receiver A2 form into a solenoid inductor A. The solenoid inductor A is connected to a program controller B and then to power supply C (see FIG. 3). The program controller B includes a main processing unit (MPU) which detects and counts induced signals and controls power supply output voltage according to the detected result of speed so as to control the speed of the motor-in-wheel. Power supply C is formed of the storage battery set received in the battery box 9.

As an alternate form of the present invention, an infrared transceiver may be installed to replace the solenoid inductor A of the reflector A1 and the receiver A2. The infrared transceiver produces signals to the program controller B for detecting and measuring the speed.

Figure 4:
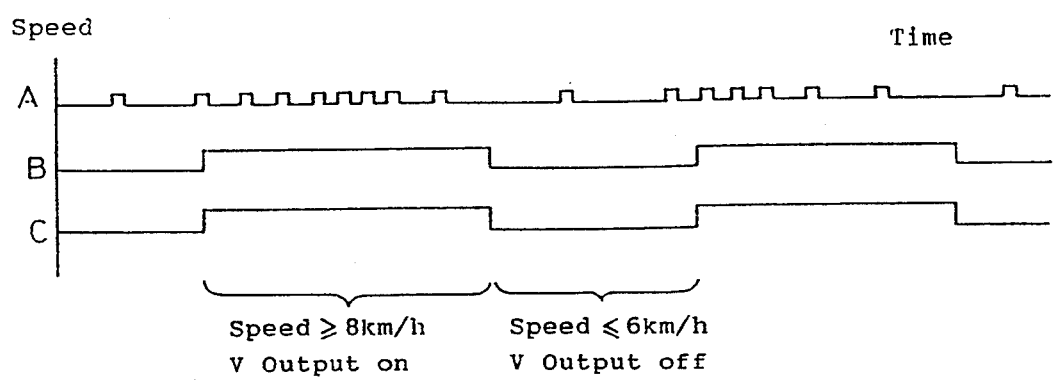
FIG. 4 is a speed control curve according to the present invention.

Referring to FIG. 4, when the power switch which controls of the power supply of the motor-in-wheel is switched on, the wheels of the bicycle is propelled by the rider. The motor-in-wheel can be effectively activated only when the speed of the wheels surpasses 8 kms per hour. When the speed of the wheels drops below 6 kms per hour, the power supply is automatically cut off. Therefore, the motor-in-wheel works only when the speed of the bicycle surpasses a predetermined critical range (for example: 8 kms per hour). If the motor-in-wheel turns the wheels of the bicycle immediately after the power switch was switched on (either intentionally or by an error), the bicycle may rush ahead causing an accident to happen. Therefore, this start control by speed and automatic power shut-off design makes the motor-in-wheel safe in use.

The starting speed of the motor-in-wheel is preferably set at about 8 kms per hour and the critical point of automatic power shut-off is set at about 6 kms per hour. This arrangement prevents the motor-in-wheel from producing a resonance. In case the starting speed of the motor-in-wheel and the automatic power shut-off critical point are both set at the same speed, the motor-in-wheel will vibrate heavily and be caused damage easily. The speed control device for controlling the speed of the motor-in-wheel may be installed in the handlebar 85 of the bicycle, and made in a rotary type to regulate the voltage and current to the motor-in-wheel either step by step or steplessly.

What is claimed is:
1. An electric motor-in-wheel comprising:
an outer shell, a motor casing contained within said outer shell, an armature contained within said motor casing, a flat type commutator circumferen- tially surrounded by said armature, a field magnet for applying a magnetic field to said armature, a hub circumferentially surrounded by said flat type commutator, bearings for facilitating relative rotation of the armature, the flat type commutator, and the hub with respect to the outer shell, the motor casing, and the field magnet, a circular mounting block disposed between the flat type commutator and the hub, a fixed wheel axle, a control box and a battery box; wherein:

said armature comprises a stack of silicon steel plates and a winding wound around said stack of silicon steel plates;

said flat type commutator is connected to said armature in a flush manner and extends radially out from said hub; and said fixed wheel axle includes a side hole disposed on a lateral side of said fixed wheel axle and a longitudinal hole extending out through a longitudinal end of the fixed wheel axis for receiving electrical wires.

2. The electric motor-in-wheel of claim 1 wherein said outer shell comprises a one-way clutch disposed at one side of the outer shell and connected to one end of said hub.

3. The electric motor-in-wheel of claim 1 wherein said outer shell comprises a plurality of fins spaced over an inside wall thereof, and a plurality of vent holes spaced around the outer shell.

4. The electric motor-in-wheel of claim 1 wherein said fixed wheel axle has two opposite ends, each of said two opposite ends being connectable to a first end of a shock absorbing spring means, said shock absorbing spring means having a second end connected to the frame of a bicycle.

5. The electric motor-in-wheel of claim 1 wherein said electric motor-in-wheel can be connected to said control box and to a power supply unit by said electrical wires, said control box having a programmable control circuit which is connected to a solenoid inductor and said power supply unit.

6. The electric motor-in-wheel of claim 5, wherein said solenoid inductor is comprised of a reflector mounted on said outer shell and a receiver mounted on said motor casing, and controlled by said programmable control circuit to detect a rotational speed of said outer shell relative to said motor casing for permitting said programmable control circuit to turn on said armature or prevent power flow to said armature according to a predetermined speed range.

7. The electric motor-in-wheel of claim 5, wherein said programmable control circuit is further connected to a rotary control switch installed in a handle bar, for regulating an amount of voltage and current passing from said power supply unit to said armature.

8. The electric motor-in-wheel of claim 1, wherein said electric motor-in-wheel can be connected to said control box and a power supply unit by said electrical wires, said control box having a programmable control circuit connected to an infrared transceiver and said power supply unit.

* * * * *